United States Patent [19]

Grove

[11] 4,293,267
[45] Oct. 6, 1981

[54] MANUALLY OPERABLE CHAIN DRIVE FOR A BOAT LOADER

[76] Inventor: Russell E. Grove, 5679 N. Van Ness Blvd., Fresno, Calif. 93711

[21] Appl. No.: 129,021

[22] Filed: Mar. 10, 1980

[51] Int. Cl.³ .............................................. B60R 9/04
[52] U.S. Cl. ..................................... 414/462; 74/545; 242/106; 254/358; 474/150
[58] Field of Search ............... 414/462; 254/311, 357, 254/358; 242/54, 55, 85, 85.52; 74/543, 544, 545, 546; 474/150

[56] References Cited

U.S. PATENT DOCUMENTS

| | | | |
|---|---|---|---|
| 676,804 | 6/1901 | Vail | 254/358 X |
| 981,071 | 1/1911 | Davis | 474/150 X |
| 1,004,160 | 9/1911 | Gardner | 474/150 |
| 2,412,508 | 12/1946 | Jensen | 242/54 R |
| 2,616,637 | 11/1952 | Schroeml | 254/358 X |
| 2,868,469 | 1/1959 | Sullivan | 242/55 |
| 2,896,804 | 7/1959 | Ingram | 414/462 |
| 3,954,199 | 5/1976 | Grove | 414/462 |
| 4,175,905 | 11/1979 | Garrison et al. | 414/462 |

Primary Examiner—Leslie J. Paperner
Attorney, Agent, or Firm—Huebner & Worrel

[57] ABSTRACT

A drive unit adapted to be coupled with a drive shaft of a windlass for a boat loader mounted atop a camper shell characterized by a rigid bar having a pair of mutually spaced sprocket wheels mounted at the opposite ends of the bar for rotation about the parallel axes and an endless drive chain trained about the sprocket wheel. A first spring-loaded coupler for releasably connecting to the drive shaft one sprocket wheel of the pair and a second spring-loaded coupler for releasably connecting a crank handle to the other sprocket wheel of the pair.

2 Claims, 9 Drawing Figures

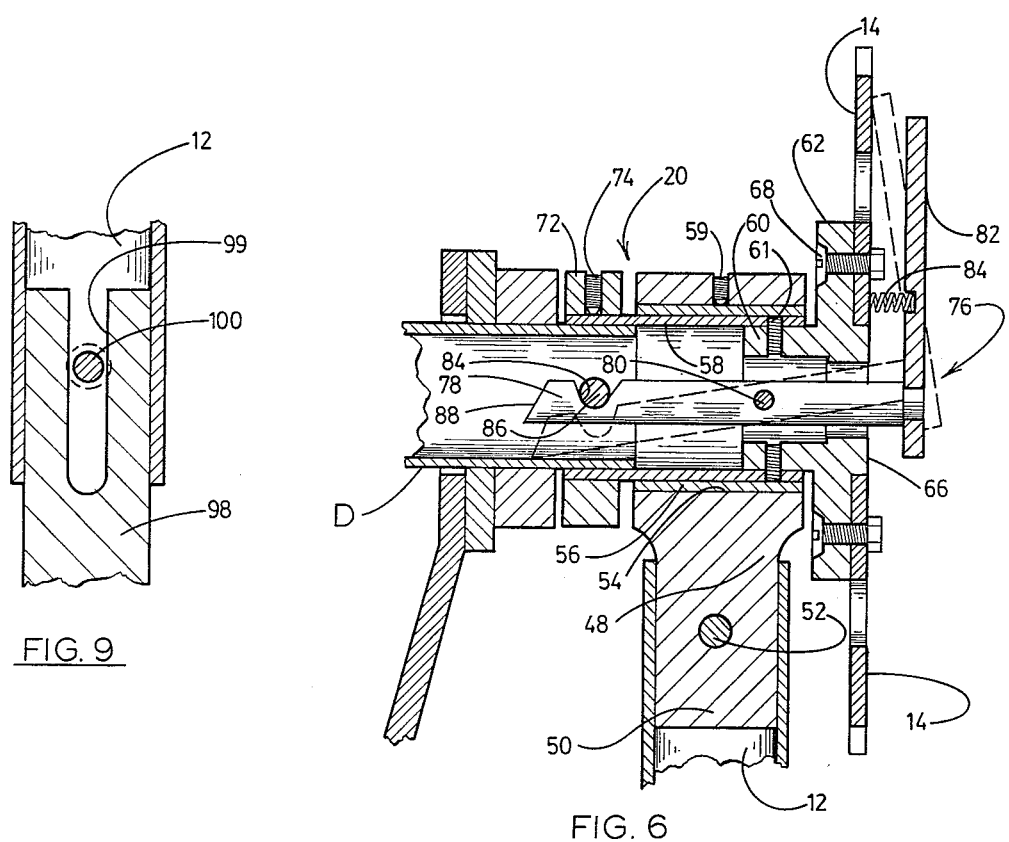
FIG. 9
FIG. 6
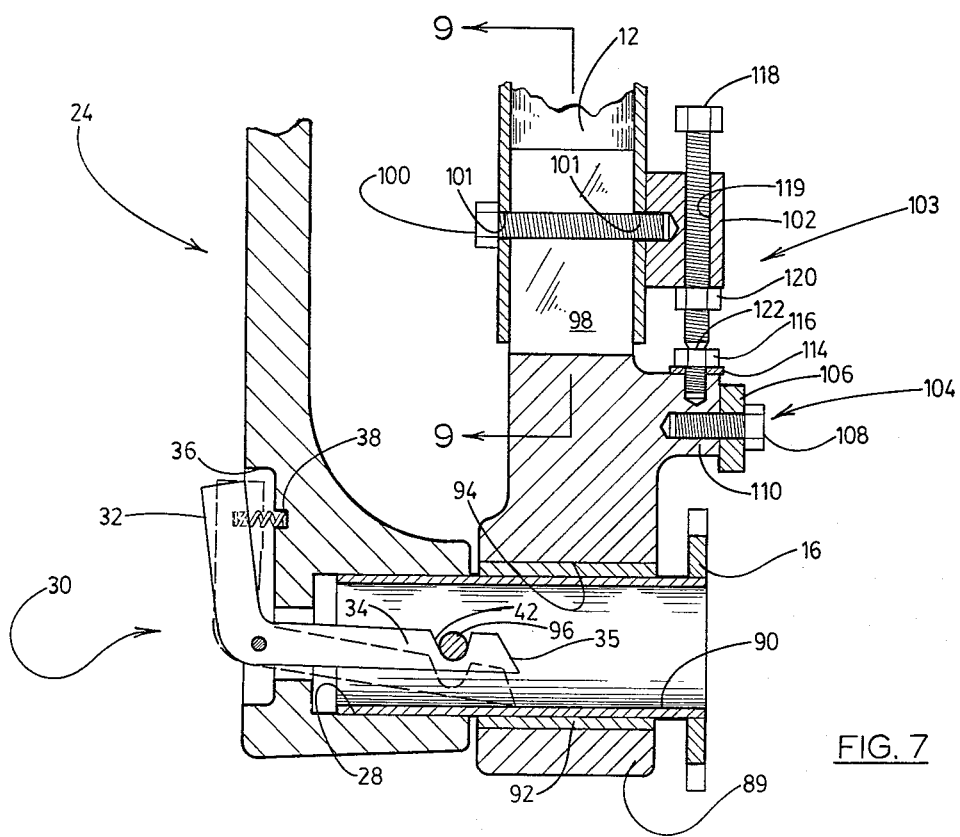
FIG. 7

MANUALLY OPERABLE CHAIN DRIVE FOR A BOAT LOADER

BACKGROUND OF THE INVENTION

1. Field of the Invention

The invention generally relates to manually operable drive mechanisms, and more particularly to an improved chain-drive unit adapted to be releasably coupled with the drive shaft of a windlass for a boat loader mounted atop a camper shell.

2. Description of the Prior Art

The prior art is, of course, replete with boat loaders adapted to hoist boats atop camper shells and the like. For example, applicant's prior U.S. Pat. No. 3,954,199, which issued May 4, 1976, discloses and claims such a device.

While applicant's patented boat loader functions quite satisfactorily for its intended purpose, it has been found, in practice, that in some instances where the user lacks the strength or height considered to be desirable for purposes of effecting an expeditious operation of the boat loader, use of the patented device may be found to be slightly inconvenient.

It is, therefore, the general purpose of the instant invention to provide for use in combination with applicant's patented boat loader, or the like, a manually operable drive unit adapted releasably to be coupled with the drive shaft of a windlass commonly provided for the boat loader for facilitating the operation thereof.

OBJECTS AND SUMMARY OF THE INVENTION

It is an object to provide an improved manually operable chain drive unit.

It is another object of the instant invention to provide an improved, manually operable drive unit particularly adapted releasably to be coupled with the drive shaft of a windlass for a boat loader mounted atop a camper shell.

It is another object to provide in combination with a boat loader particularly adapted for use in stowing boats atop overland vehicles such as camper shells, and the like, a chain drive unit including a releasable coupling mechanism for coupling the unit with the windlass for the boat loader and a spring-biased coupler for coupling a hand crank to the unit.

These and other objects and advantages are achieved through the use of a manually operable chain-drive unit characterized by a rigid bar, a pair of mutually spaced sprocket wheels, said sprocket wheels being supported at opposite ends and opposite sides of the bar for rotation about mutually parallel axes extended through the opposite end portions of the bar, an endless chain trained about the sprocket wheels, and spring-loaded coupling devices for releasably connecting the unit to the windlass of a boat loader and for coupling a hand crank to the unit in a position particularly convenient for use in operating the boat loader.

DESCRIPTION OF THE DRAWINGS

FIG. 5 is a horizontally sectional view taken generally along lines 5—5 of FIG. 2.

FIG. 6 is a vertically sectional view taken generally along lines 6—6 of FIG. 3.

FIG. 7 is a vertically sectional view taken generally along lines 7—7 of FIG. 4.

FIG. 8 is an elevational view of a crank handle employed in combination with the drive unit embodying the principles of the instant invention.

FIG. 9 is a vertically sectional view taken generally along lines 9—9 of FIG. 7.

DESCRIPTION OF THE PREFERRED EMBODIMENT

Figure 1:
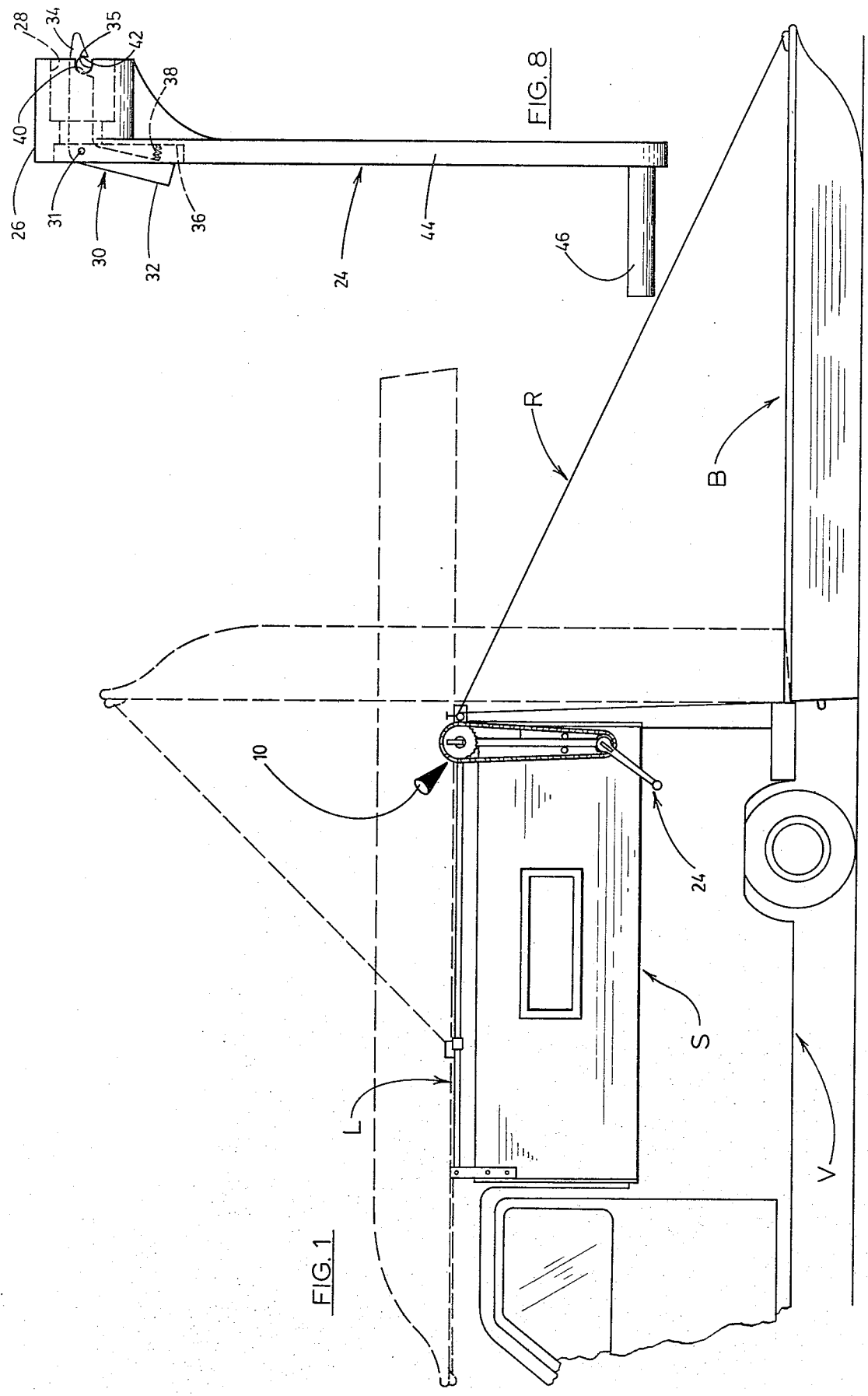
FIG. 1 is a side-elevational view of a vehicle, equipped with a boat loader having connected thereto a manually operable drive unit embodying the principles of the instant invention.

Referring now to the drawings, with more particularity, wherein like reference characters designate like or corresponding parts throughout the several views, there is shown in FIG. 1, a fragmented, side-elevational view of an overland vehicle, generally designated V, equipped with a camper shell, generally designated S, having mounted thereon a boat loader, generally designated L, particularly suited for use in loading a boat, generally designated B. Since the boat loader L is more fully described in applicant's previously issued U.S. Pat. No. 3,954,199, aforementioned, a detailed description of the boat loader and its mode of operation is omitted in the interest of brevity. It suffices, at this juncture, to understand that the boat loader L includes a windlass W having a drive shaft generally designated D, FIG. 2, about which is wound a line or rope, designated R, for purposes of pivotally advancing a boat along an arcuate path to assume an inverted, loaded disposition atop the shell S.

Depicted in FIG. 1, in combination with the boat loader L, is a manually operable, detachable, chain-drive unit, generally designated 10, which embodies the principles of the instant invention.

Figure 2:
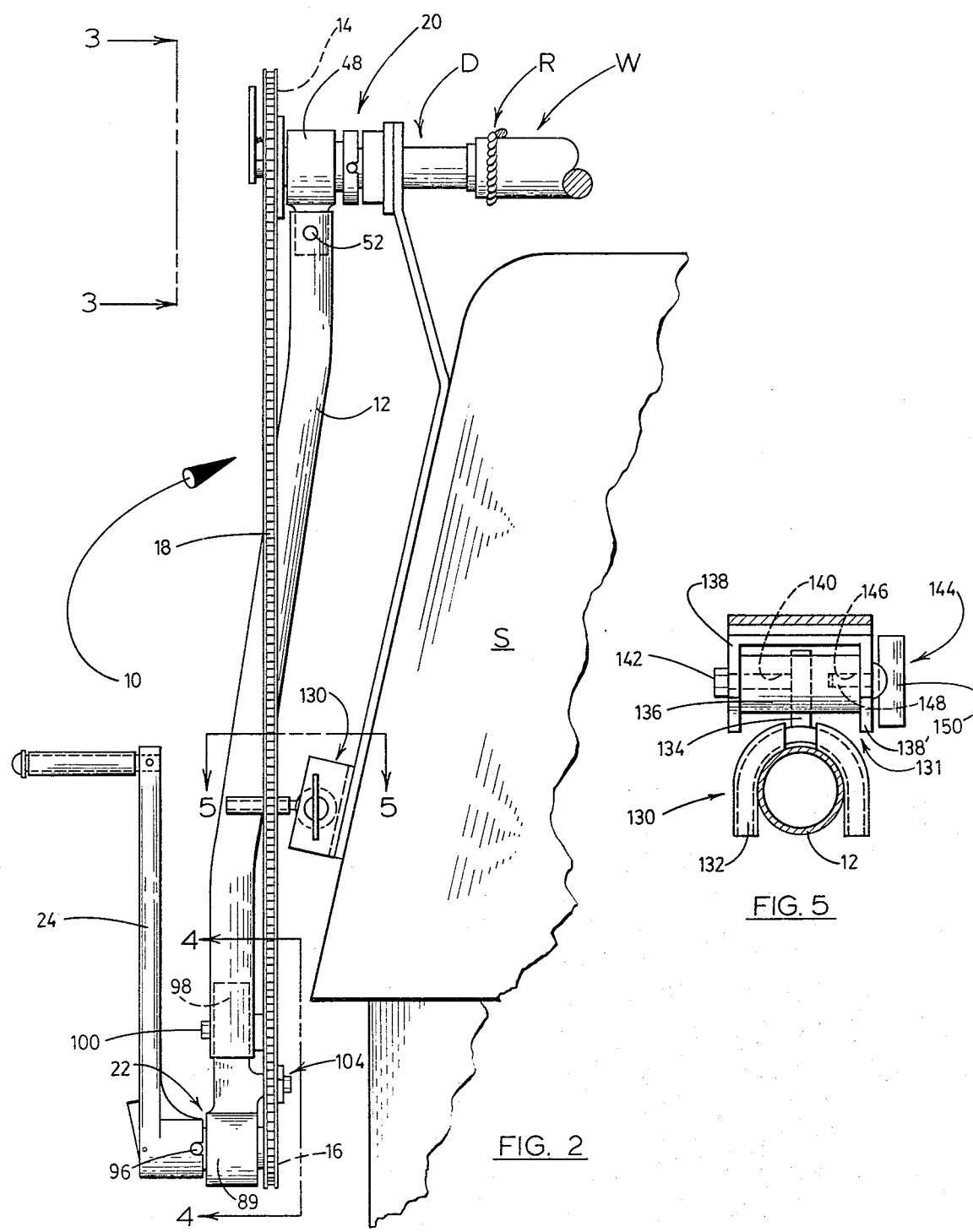
FIG. 2 is a fragmented, end elevational view of the vehicle shown in FIG. 1, on an enlarged scale, depicting the drive unit which embodies the principles of the instant invention.
Figure 3:
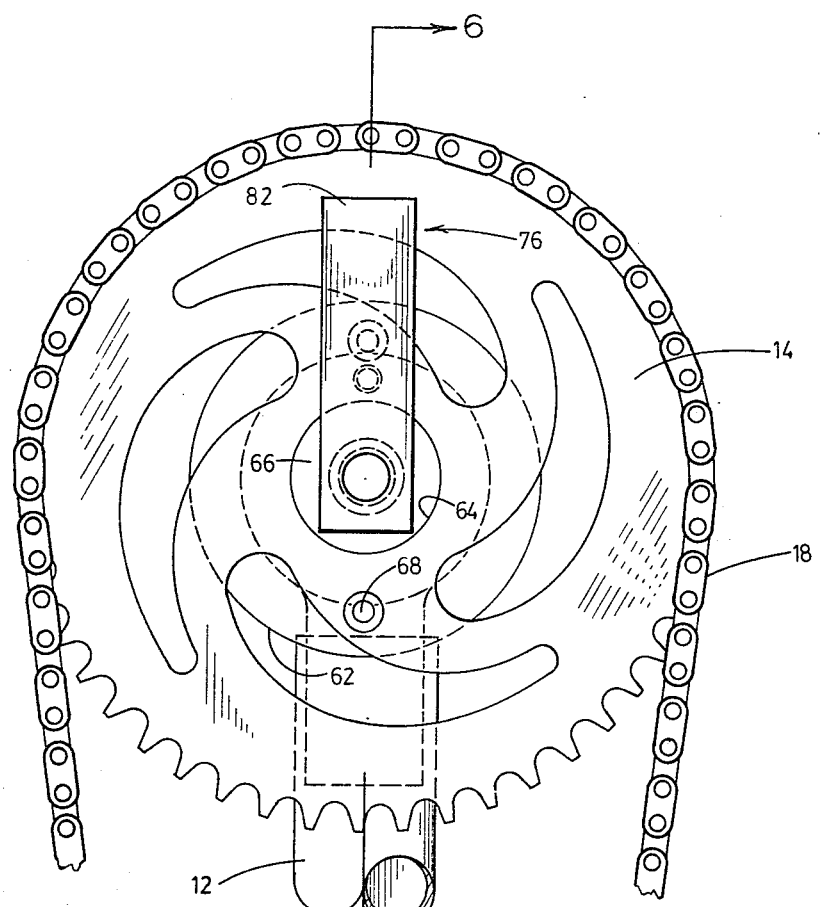
FIG. 3 is a fragmented, elevational view taken generally along lines 3—3 of FIG. 2.

As best shown in FIG. 2, the drive unit 10 includes a rigid bar defining a back bone for the unit 10. The rigid bar 12 comprises a tubular body and includes at its uppermost end, as shown, a first sprocket wheel 14, while a second sprocket wheel 16 is provided at the lowermost end of the bar 12. Trained about the sprocket wheels 14 and 16, there is a drive chain 18, of suitable design, including links adapted to be received by the sprockets of the sprocket wheels 14 and 16.

It is important to note that the drive unit 10 includes a releasable coupling, generally designated 20, for coupling the drive unit to the drive shaft D for the windlass W, while a second coupling 22 is provided for connecting the handle 24 to the lowermost sprocket wheel 16.

Referring for a moment to FIG. 8, it can be seen that the crank handle 24 is of a design substantially the same as that shown and described in applicant's prior U.S. patent. For present purposes, it is sufficient to say that the crank handle 24 includes a head 26 having defined therein a socket 28 into which is extended a spring-biased dog 30 for a coupling mechanism. The dog 30, as shown, is of a generally L-shaped, integral configuration, supported for pivotal motion by a suitable pivot pin 31, and characterized by a thumb lever 32 and a tongue 34 terminating in a camming surface 35. The purpose of the camming surface will hereinafter become readily apparent.

The handle 26 also includes an external relief 36 for receiving the thumb lever 32 in its depressed condition. A suitable compression spring 38 is seated in a recess beneath the thumb lever 32 and thus serves to spring-load the dog 30.

Additionally, the head 26 includes a diametrically extended relief 40, FIG. 8, while the tongue 34 includes a relief 42 positioned to assume a coaxially aligned relationship with the relief 40, when in its pin-capturing disposition illustrated in FIG. 8. Finally, the crank handle 24 includes a lever arm 44 to which is affixed an angularly related handle 46. This handle serves to facilitate a manipulation of the crank handle 24 in a manner fully appreciated by those familiar with the use of crank handles.

Referring again to FIG. 2 and FIG. 6, it can be seen that the uppermost end of the bar 12 is provided with a bearing block 48 including a neck 50. The neck 50 is telescopically received by the tubular bar 12 and secured in place by a suitable pin 52 extended diametrically through the bar and neck. The bearing block 48 is cast and/or machined to provide an aperture 54 having rigidly secured therein a bearing sleeve 56 formed of any suitable material. The bearing sleeve 56, in turn, concentrically receives a tubular bearing shaft 58 having attached to one end thereof a stub shaft 60. Preferably, the bearing sleeve 56 is secured within the aperture 54 by means including a conventional set-screw 59, while the stub shaft 60 is received in and secured to the shaft 58 by set screws 61.

The stub shaft 60, as shown, is integrally related to and extends axially from an annular mounting plate 62 upon which is mounted the sprocket wheel 14. The sprocket wheel 14 includes an opening 64 concentrically received by an annulus 66 defining a crown projected axially from the stub shaft 60. Suitable fasteners, designated 68, are provided for securing the sprocket wheel 14 to the mounting plate 62.

As best shown in FIG. 6, the internal diameter of the shaft 58 is substantially equal to but slightly greater than the external diameter of the adjacent end portion of the drive shaft D for the windlass, aforementioned. Consequently, the drive shaft D is dimensioned to be received telescopically within the bearing shaft 58.

In order to secure the unit 10 to the drive shaft D, there is provided a spring-loaded dog, generally designated 76, similar in many respects to the dog 30, afore-discussed. The dog 76, as shown, includes a tongue 78 extended axially into the shaft 58 and is supported for pivotal displacement by a suitable pin 80 seated in the stub shaft 60. A thumb lever 82 is integrally related to the tongue 78 and projects substantially perpendicularly from the tongue 78, as best shown in FIG. 6. The dog is spring-loaded by a compression spring 84 interposed between the adjacent surfaces of the sprocket wheel 14 and the surface of the thumb lever 82. It is to be understood that simply by depressing the thumb lever 82, pivotal motion is imparted to the tongue 78, about the pivot pin 80, for thus imparting substantially radial displacement to the distal end portion of the tongue 78.

Defined within the end portion of the tongue 78, there is a relief, or notch 84. The purpose of the relief 84 is to capture a coupling pin 86 projected diametrically through the end portion of the drive shaft D. The tongue 78 is inclined to provide a ramp surface 88. This surface initiates a camming-over or radial displacement of the end of the tongue as the surface 88 engages the surface of the pin 86, upon the drive shaft D being received within the shaft 58.

Moreover, it is to be understood that once the drive shaft D is fully seated within the shaft 58, the relief 84 is so positioned relative to the pin 86 that the spring 84 acts against the undersurface of the thumb lever 82 for pivotally displacing the relief 84 into capturing relation with the pin 86. A release of the pin 86, relative to the dog 76, is effected simply by depressing the thumb lever 82, against the spring 84, for thus pivoting the distal portion of the tongue 78 for effecting its disengagement with the pin 86.

It is noted that the opposite end of the bar 12 is provided with a bearing block 89, the purpose of which is to support a drive shaft 90 for the sprocket wheel 16. The sprocket wheel 16, as shown, is welded to the endmost portion of the shaft 90; however, other means including mounting plates, collars, and the like, are available and may be employed for this purpose.

The block 89 is provided with a bearing sleeve 92 for receiving the shaft 90 concentrically. This sleeve is, in turn, seated in an aperture 94, machined or otherwise formed in the head 89, having an axis which extends in substantial parallelism with the axis of the aperture 54. The shaft 90 thus is supported for rotation by the bearing sleeve 92 and is of a length to be projected axially therefrom.

Extended diametrically through the shaft 90 is a coupling pin 96, the opposite ends of which project radially from a cylindrical surface of the shaft 90. The projected ends of the pin 96 serve to restrain the shaft from axial displacement relative to the sleeve 92. Of course, other suitable means, including collars and the like, may be employed for this purpose.

Referring again to FIG. 7, it should be apparent that as the socket 28, for the crank handle 24, receives the extended end portion of the shaft 90, the surface 35 of the tongue 34 engages the coupling pin 96 and is cammed radially thereby until such time as the relief 42 is positioned opposite the pin 96. The dog 30, under the influence of the spring 38, is then pivoted in an opposite direction and caused to capture the pin 96, for purposes of attaining and maintaining a mated relationship for the crank handle 24 and the drive shaft 90. Like the dog 76, previously mentioned, the pin 96 is readily released from the dog 30 simply through a depressing displacement being imparted to the thumb lever 32 for thus pivoting the tongue 34. Thus a disassociation of the crank handle from the drive shaft 90 is facilitated.

It is also important to note that the head 89 also includes a mounting neck 98 inserted axially into the adjacent end of the bar 12. The neck 98, as shown, includes an axially slotted opening 99 through which extends a screw 100, also extended through aligned apertures 101 formed in the bar 12.

Also, as shown, the screw 100 extends to be received by an internally threaded bore, not designated, provided in a mounting block 102. This block functions as a stop for a tension adjusting mechanism, generally designated 103, for the chain 18.

Figure 4:
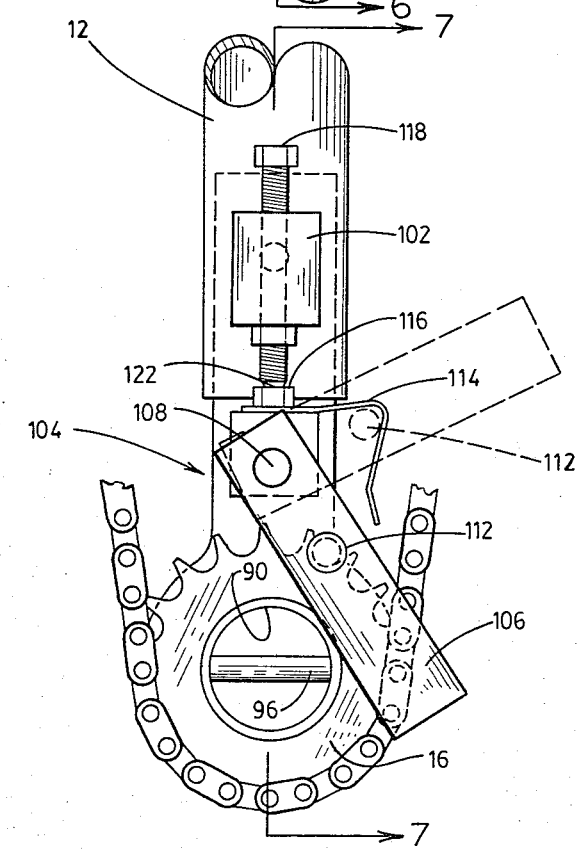
FIG. 4 is a fragmented elevational view taken generally along lines 4—4 of FIG. 2.

Adjacently related to the block 102 is a ratchet assembly 104. The ratchet assembly 104 includes a pawl supporting arm 106. The arm 106 is pivotally mounted on a pin 108 threaded into a bore radially extended into a mount 110. The mount is integral with the block 98 and is projected radially therefrom. It is to be understood that the arm 106 is supported to pivot in a vertical plane and is provided with a suitable latching pin, FIG. 4, defining a pawl 112 extended perpendicularly from the arm 106. The pawl 112 is configured to be received between the sprockets of the sprocket wheel 16 for purposes of securing the sprocket wheel against rotation.

It should here be appreciated that the pawl 112 readily is lifted or cammed from between the sprockets against the weight of the arm 106 as clockwise rotation is imparted to the sprocket wheel 16, by the crank handle 24, but serves to restrain the sprocket wheel 16 against reversed rotation.

Thus the crank handle 24 may be manipulated for rotating the sprocket wheel 16 in a clockwise direction for thereby imparting a clockwise rotation to the sprocket wheel 14, via the chain 18, while reversed displacement of the sprocket wheels is precluded by the pawl 112 of the ratchet assembly 104.

A retainer spring 114 is affixed to the mount 110 through the use of a suitable screw 116 threaded into a blind bore projected into the mount. The retainer spring 114 is so configured as to receive the pawl 112 in captured relation once the arm 106 is pivoted upwardly about the pin 108.

With particular reference again to FIG. 7, it can be seen that the block 102 is provided with a positioning adjusting screw 118 extended vertically through a suitably threaded bore 119 to engage the head of the screw 116. A jam nut 120 is provided for securing the adjusting screw 118 against axial displacement while the adjusting screw 118 is provided with an end bearing surface 122 seated on the upper surface of the head of the screw 116. Consequently, by axially advancing the adjusting screw 188, in either direction, through the block 102, the position of the head 89, relative to the rigid bar 12 may be varied.

Of course, in order to facilitate such a repositioning of the head it is necessary, or at least desirable, to back-off the screw 100 sufficiently for loosening the grip of the bar 12 on the neck 98 as well as to loosen the jam nut 120 for facilitating advancement of the screw 118. Once a suitable tension is imparted to the chain 18, the screw 100 and jam nut 120 are again tightened for thus securing the head 89 in a proper position for maintaining suitable tension for the chain 18.

In order to secure the rigid bar 12, while the unit 10 is being operated, against pivotal displacement about the axis of rotation for the drive shaft D, there is provided a stabilizer, generally designated 130, adapted to be mounted on the adjacent side surface of the camper shell S. As a practical matter, it is preferred that the stabilizer 130 be mounted on a member provided for supporting the boat loader L, as best shown in FIG. 2. The stabilizer 130 includes a bracket 131 having a U-shaped yoke 132 mounted thereon. The legs of the yoke 132 are spaced sufficiently for receiving therebetween the bar 12. A mounting pin 134 is affixed to the yoke 132 and is received within a radial bore, not designated, provided within a cylindrical base member 136. The base member 136 is, in turn, received between a pair of mutually spaced sides 138 of the bracket 131. As shown, the base member 136 includes an internally threaded bore 140 for a set screw 142, FIG. 5. In practice, the set-screw 142 is extended axially into the base member 136 a distance sufficient for engaging and securing the mounting pin 134 against radial displacement relative to the base member 136. Consequently, the radial position of the U-shaped yoke 132 may be varied, for adjustment, and secured in place simply by tightening the set-screw 142. Also, it should be noted that the set-screw also functions as a bearing pin for the base member 136.

Opposite the side 138 of the bracket 131 there is provided a side 138' for mounting a friction brake, designated 144. The friction brake 144 includes an internally threaded bore 146 extended axially into the base member 136 for receiving an externally threaded pin 148, extended through the side 138'. This pin is characterized by a wing 150 provided at its external endmost portion. Consequently, by tightening the pin 148 into the threaded bore 146, the adjacent surfaces of the side 138' and the base member 136 are drawn into frictional engagement for thereby achieving a clamping of the side 138' between the adjacent surfaces. Thus the yoke 130 may be readily positioned into an outwardly projected disposition for arresting the rigid bar 12, or released and deposited in a downturned position for safety and convenience when the drive unit 10 is disassociated from the loader L.

OPERATION

It is believed that in view of the foregoing description, the operation of the invention herein disclosed and claimed readily is apparent, however, in the interest of completeness, the operation of the disclosure of the invention is at this point briefly reviewed.

With the drive unit 10 assembled in the manner hereinbefore described, it readily is mounted in connected relation with the drive shaft D of a boat loader L disposed atop a camper shell S, in a manner generally depicted in FIGS. 1 and 2, and more fully discussed in applicant's prior patent, aforementioned.

It will be appreciated that in order to mount the unit 10 on the drive shaft D, the bearing shaft 58 is telescopically positioned in received relation with the endmost portion of the drive shaft D, as illustrated in FIG. 6. As the shafts D and 58 are brought into telescopic relation, the inclined or camming surface 88 of the tongue 78, for the dog 76, engages the coupling pin 86 and is cammed radially, as indicated in dashed lines, causing the tongue to pivot about the pivot pin 80 against the applied forces of the spring 84. As continued telescoping relative motion is imparted to the shafts D and 58, the relief 84 assumes a position radially related to the pin 80 whereupon the spring 84 becomes effective for forcing the tongue 78 in an opposite direction for thus causing the pin 86 to seat in the relief 84, as illustrated, whereby a coupled relationship between the dog 76 and the pin 86 is established.

At this juncture, the pin 144 is loosened relative to the internally threaded bore 146 of the stabilizer 130, for thus permitting the U-shaped yoke 132 to be pivoted into a horizontal disposition, as illustrated in FIGS. 2 and 5, for receiving the bar 12. Of course, should adjustment in horizontal direction be desired, the set-screw 142 is loosened and the pin 134 moved in an appropriate direction until the bar 12 is properly seated in the yoke 132. Thereupon, the set-screw 142 is tightened for securing the pin in place, relative to the base member 136. The wing 150 now is tightened for securing the yoke 132 in an outwardly projected relationship with the bracket 131.

Should it become desirable to adjust the tension of the chain 18, the screw 100 and jam nut 116 are slightly loosened and the screw 118 advanced in an appropriate direction for repositioning the head 89 to a position in which the chain 18 achieves desired tension. Thereafter, the screw 100 and nut 116 are again tightened for securing the head in its appropriate position.

The crank handle 24 is attached to the sprocket wheel 16 simply by inserting the extended end portion of the shaft 90 into the socket 28 of the crank handle 24 a distance such that the tongue 34 is cammed to one side by the pin 96, acting on the inclined face 35, until such time as a tongue is caused to assume a position opposite the pin 96, whereupon the spring 38 becomes effective for causing the tongue 34 to be pivotally displaced in an opposite direction for causing the relief 42 to capture the pin 96.

At this juncture, the operator pivots the arm 106 downwardly sufficiently for causing the pawl 112 of the ratchet assembly 104 to seat between sprockets of the sprocket wheel 16. Of course, in the event no ratcheting effect is desired, it is possible to pivot the arm 106 in an opposite direction for causing the pawl 112 to be captured by the retainer spring 114. However, in practice, the purpose of the ratchet assembly 104 is to preclude undesired reverse rotation of the windlass during a boat loading operation.

As the crank handle is rotated in a clockwise direction, for thus imparting clockwise rotation to the windlass W, the pawl 112 is cammed from and drops between successive sprockets of the sprocket wheel 16, thereby accommodating unidirectional rotation of the sprocket wheel 16.

Of course, as clockwise rotation is imparted to the sprocket wheel 16 the chain 18 drives the sprocket wheel 14 in clockwise direction for thereby driving the drive shaft D and consequently the windlass W in a clockwise direction. Thus the boat B is advanced along its arcuate path as the rope R is wound about the windlass W in a manner more fully discussed in applicant's previously mentioned patent.

It is important to appreciate that the drive unit 10 embodying the principles of the instant invention, serves as a means for repositioning the handle 24 at a suitable height and location as to facilitate operation of the boat loader L with greater ease. Moreover, where so desired, the unit 10 may be left in place with the handle 24 being removed for stowage. If desired, however, the unit 10 may be disassociated from the loader L simply by depressing the thumb lever 82 for releasing the pin 86 from its captured relationship with the tongue 78, and the unit 10 thereafter disconnected from the loader L by axially extracting the shaft 58 from its telescopic relationship with the shaft D.

It is believed to be readily apparent that the instant invention readily facilitates an operation of the boat loader L with enhanced ease.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. In combination with a boat handling apparatus particularly suited for use in stowing boats aboard overland vehicles characterized by a first means including a windlass adapted to be mounted atop an overland vehicle and a hoisting line adapted to be connected to the bow of a boat positioned in spaced relation with the vehicle and below the level of the top thereof for pivotally advancing the boat along an arcuate path into a received relationship atop said vehicle, the improvement comprising:

a pair of sprocket wheels;
a rigid bar supported in suspension by said windlass having at each end of its opposite ends one sprocket wheel of said pair supported for rotation, an endless chain arranged in coplanar relation with the pair of sprocket wheels and trained thereabout interconnecting one of the sprocket wheels of the pair in a driving relationship with the other sprocket wheel of said pair, first coupling means for releasably coupling the other sprocket wheel to said windlass in a driving relationship, a crank handle, second coupling means for releasably connecting said crank handle in a driving relationship with said one sprocket wheel, a support member for restraining said bar from pivotal motion relative to the axis of rotation for the windlass comprising a yoke adapted to be mounted on a side surface of the vehicle and supported for pivotal displacement into capturing relation with said rigid bar, and means for securing said yoke in a fixed relationship with said bar.

2. The improvement of claim 1, wherein said rigid bar comprises a laterally curved bar passing through the plane of said endless chain for supporting said pair of sprocket wheels in a substantially vertical plane.

* * * * *

UNITED STATES PATENT AND TRADEMARK OFFICE
CERTIFICATE OF CORRECTION

PATENT NO. : 4,293,267

DATED : October 6, 1981

INVENTOR(S) : Russell E. Grove

It is certified that error appears in the above-identified patent and that said Letters Patent are hereby corrected as shown below:

Column 5, line 34, delete "188" and substitute ---118---.

Signed and Sealed this

Twenty-ninth Day of December 1981

[SEAL]

Attest:

GERALD J. MOSSINGHOFF

Attesting Officer

Commissioner of Patents and Trademarks